United States Patent [19]

Lanham, Jr.

[11] Patent Number: 4,636,129
[45] Date of Patent: Jan. 13, 1987

[54] METHOD AND APPARATUS FOR REMOVING BAKERY CARRIER SCREENS FROM CONVEYOR

[75] Inventor: William E. Lanham, Jr., Stone Mountain, Ga.

[73] Assignee: Lanham Machinery Company, Inc., Atlanta, Ga.

[21] Appl. No.: 747,406

[22] Filed: Jun. 21, 1985

[51] Int. Cl.$^4$ .............................................. B65G 65/06
[52] U.S. Cl. .................................... 414/417; 414/418; 414/786; 198/465.1
[58] Field of Search ............... 414/331, 416, 417, 418, 414/786; 99/386, 443 C; 198/465.1, 803.01; 220/19

[56] References Cited

U.S. PATENT DOCUMENTS

| | | | |
|---|---|---|---|
| 1,279,563 | 9/1918 | Lowell | 414/416 |
| 2,639,049 | 5/1953 | Kinzelman et al. | 414/417 |
| 2,897,772 | 8/1959 | Hunter | 414/417 X |
| 2,951,422 | 9/1960 | Bobkowski | 414/417 X |
| 2,975,920 | 3/1961 | Reed et al. | 414/416 |
| 3,133,660 | 5/1964 | Roberts | 220/19 |
| 3,451,569 | 6/1969 | Remensperger et al. | 414/416 |
| 3,587,891 | 6/1971 | Stadelman | 414/416 |
| 3,902,587 | 9/1975 | Checcucci | 198/425 |
| 4,005,792 | 2/1977 | Schulman et al. | 414/416 |
| 4,273,496 | 6/1981 | Papalexis | 414/417 |
| 4,324,326 | 4/1982 | Khoylian et al. | 198/461 |

FOREIGN PATENT DOCUMENTS 758504 10/1956 United Kingdom ................. 414/417

*Primary Examiner*—Joseph E. Valenza
*Assistant Examiner*—David A. Bucci
*Attorney, Agent, or Firm*—Pasquale A. Razzano

[57] ABSTRACT

A method and apparatus for removing a bakery carrier screen, which is carrying a bakery product and traveling on a moving conveyor system, from underneath the carried bakery product and transferring the bakery product to an exit conveyor during substantially continuous forward motion of the bakery product is provided. The carrier screen upon which the bakery product is placed has a generally rectangular and planar surface with a plurality of parallel longitudinal slots extending from the leading edge to the trailing edge of the screen. A product entrance conveyor is provided which has a plurality of substantially parallel and spaced apart endless conveyor belts terminating in generally aligned pulleys, and a conventional full width endless conveyor for removing the products arranged at the forward end of the entrance conveyor belts. The spacing and arrangement of the entrance conveyor belts is such that when the carrier screen with the carried product reaches the forward end of the entrance conveyor, the carrier screen interdigitates around the ends of the entrance conveyor and downwardly, between the entrance and the exit conveyor, so that the bakery product is left still supported directly by the entrance conveyor belts. The product is then transported from the entrance conveyor onto the exit conveyor without the carrier screen.

8 Claims, 3 Drawing Figures

METHOD AND APPARATUS FOR REMOVING BAKERY CARRIER SCREENS FROM CONVEYOR

BACKGROUND OF THE INVENTION

The present invention relates to automated bakery equipment, and more particularly to a device and a method for removing a carrier screen, which is carrying a bakery product and traveling on a moving conveyor system, from underneath the carried bakery product and transferring the bakery product to an exit conveyor during substantially continuous forward motion of the bakery product.

In a typical modern automated bakery, various conveyors are utilized to transport the bakery product from its unfinished state as dough to its finished state after baking, and after packaging. The design of such conveying means is well known.

Certain bakery products, such as pies and pastries, must be baked in their own individual baking trays, typically thin gauge aluminum foil which is sold to the consumer along with the product itself. Generally, these aluminum foil pans are too small and too weak to be conveniently handled by the conveying machinery by themselves. In order to provide for more efficient baking and safer handling in the conveying machinery during the baking process, the aluminum foil pans are commonly grouped together on a separate carrier screen, which is similar in construction and operation to an ordinary oven rack. By the use of a carrier screen, the more fragile bakery products, such as pies or pastries, may be evenly supported by the screen and thus less liable to damage during the baking process.

At the conclusion of the baking process, the bakery product in its aluminum foil container must be removed from the carrier screen and transported to another stage of the system, such as to packaging equipment. At this point, it is also generally desired to remove the carrier screen itself from the underlying conveyor and to transport the carrier screen separately from the bakery product to a separate part of the facility where it may be either refilled with bakery product and recycled, or stacked and stored if it is at the end of a bakery run.

Several means for accomplishing this removal of the bakery product and separation of the carrier screen from the main conveyor have been proposed. One of these, described in U.S. Pat. No. 4,324,326, dated Apr. 13, 1982, utilizes a specially designed flexible carrier screen that may be pulled down and around the termination pulley of the entrance conveyor while the bakery product continues past to an exit conveyor. The need for a flexible carrier screen may cause problems, however, since the continuous flexing and movement of the carrier screen presents the possibility of jamming.

In another proposal, described in U.S. Pat. No. 1,279,563, dated Sept. 24, 1918, the carrier screen with the bakery product on it is transported downwardly at a slant and the bakery products scraped off of the carrier screen with a spatula-like inclined plane. From there the bakery products slide to an exit conveyor. This arrangement may not be practical where the bakery products are themselves contained in their own aluminum foil pans, since the tilting of the carrier may cause the pans containing the bakery product to slide off and be damaged.

In another proposal, described in U.S. Pat. No. 1,672,522, dated June 5, 1928, flexible plaques are used to carry the bakery product, which can then be rolled around a pulley to discharge the bakery product onto an exit conveyor.

OBJECTS OF THE INVENTION

It is an object of the present invention to provide a device for removing a carrier screen, which is carrying a bakery product and traveling on a moving product conveyor, from underneath the carried bakery product and to transfer the bakery product to an exit conveyor, which device has a simple and trouble-free construction.

It is a further object of this invention to provide a slotted carrier screen, which is cooperatively designed with a device for removing the carrier screen, which is durable, easy to clean, and easy to remove from a moving conveyor, even while carrying a bakery product.

It is a further object of the present invention to provide a method for removing a carrier screen, which is supported by a horizontally moving conveyor, from underneath a bakery product carried by the carrier screen without interrupting the substantially continuous forward motion of the bakery product.

SUMMARY OF THE INVENTION

In accordance with one embodiment of the present invention, a slotted carrier screen is provided which has a generally planar and generally rectangular product support surface. The carrier screen further has a leading edge which extends from side-to-side and a trailing edge which is substantially parallel to the leading edge and also extends from side-to-side. The carrier screen has a plurality of generally rectangular and parallel slots which extend from the leading edge continuously to the trailing edge without interruption.

In another aspect of the present invention, a device for handling the slotted carrier screen is provided which has a product entrance conveying means which includes a plurality of substantially parallel and spaced apart conveying means. All of these conveying means are substantially in the same plane and each of them is narrower than the slot of the carrier screen which is immediately above it when the carrier screen is correctly positioned on the product entrance conveying means with its slots parallel to and directly above the corresponding product entrance conveying means. Driving means for at least one of the product entrance conveying means is provided.

This construction permits interdigitation of the carrier screen around the product entrance conveying means by virtue of the longitudinal slots in the carrier screen when the carrier screen reaches the end of the product entrance conveying means. An exit conveying means is provided which is disposed in front of and generally aligned with the forward end of the product entrance conveying means, but spaced a sufficient distance away from the forward end of the product conveying means so that the leading and trailing edges of the carrier screen may be introduced downwardly between the forward end of the product entrance conveying means and the back end of the exit conveying means without interference during interdigitation of the carrier screen around the front end of the product entrance conveying means.

The above, and other objects, features and advantages of the present invention will be apparent from the following detailed description of an illustrative embodiment thereof, when read in connection with the accompanying drawings, wherein:

DETAILED DESCRIPTION OF THE DRAWINGS

Figure 2:
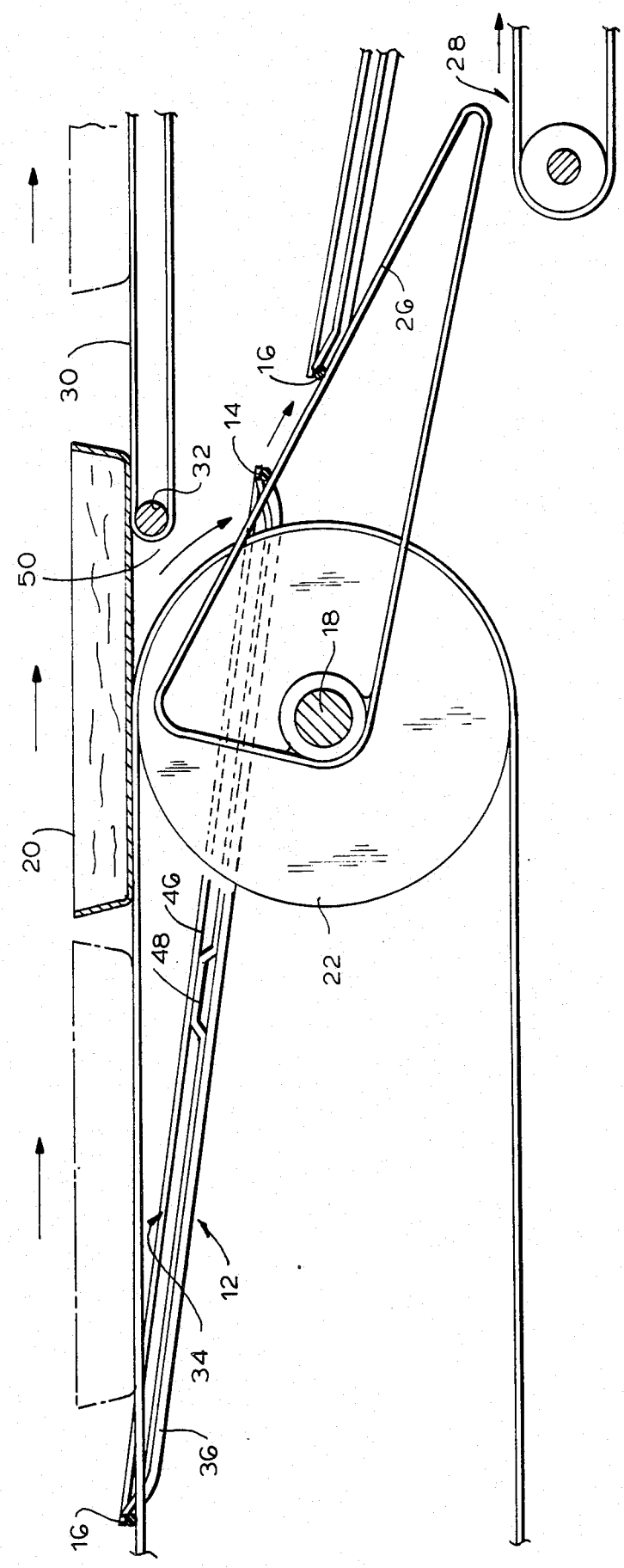
FIG. 2 is an enlarged and more detailed side view of the region of the terminous of the entrance conveying means and the carrier screen exit means.

Referring now to the drawings in detail, and initially to FIGS. 2 and 3, the construction and operation of the bakery carrier screen and carrier screen removal device will be described. As illustrated therein, a carrier screen 12 has a forwardmost leading edge 14 and a trailing edge 16 which extend from side-to-side and are perpendicular to the direction of travel of the carrier screen on the entrance conveyor means, which in this embodiment are endless belts 10. As illustrated, the carrier screen supporting surface is constructed of a plurality of longitudinal wires 46 of a heavy gauge material, such as steel rod. The rods or wires are arranged parallel to one another and parallel to the direction of travel of the carrier screen. These wires or rods are fixedly attached to the leading edge and trailing edge of the carrier screen to make a grid-like product support surface 34, preferably by welding. To provide additional strength to the product support surface, reinforcing wires 36 may be included beneath at least some of the front-to-back wires forming the product support surface, as best shown in FIG. 2. These reinforcing wires may be bent up in one or more locations along the span between the leading edge and the trailing edge and welded or fastened by convenient and sturdy means to the wire of the product support surface at 48, such as by welding.

As constructed in this manner, the product support surface forms a plurality of longitudinal slots 24 which are parallel to the direction of travel of the carrier screen, and extend the entire span of the carrier screen from the leading edge to the trailing edge continuously without interruption. Three of these slots are shown in FIG. 3, although it is to be understood that any number of slots can be provided in accordance with the present invention. The slots can be of any width but are preferably as narrow as is practicable to avoid the possibility of product falling through or getting stuck in the slots.

It is essential to the present invention that the longitudinal slots of the product support surface extend from the leading edge to the trailing edge continuously without interruption, but it is not essential that the product support surface be contructed of longitudinal wires to form these slots. The product support surface can be of any construction, including a single piece of flat steel, provided that longitudinal slots extending from the front edge to the rear edge are provided.

Figure 3:
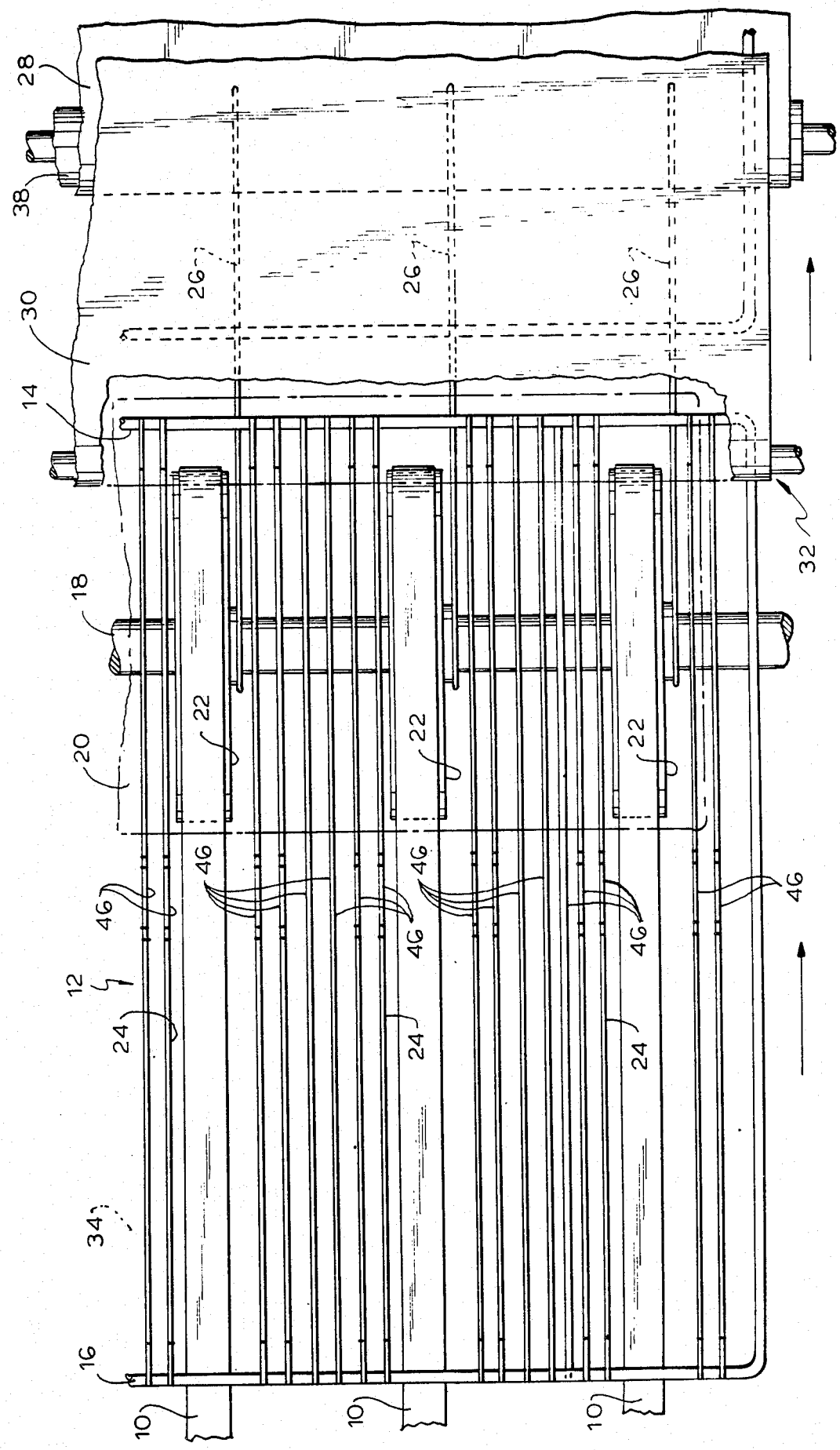
FIG. 3 is a detailed top view showing the construction of the carrier screen and the arrangement of a product entrance conveyor belt and a product exit conveyor belt.

Referring now to FIG. 3, the construction and operation of the device for removing the carrier screen from the conveying means will be described. The conveyor screen is disposed on top of the upper surface of the product entrance conveying means, which in this embodiment is a plurality of belts 10. Three such belts are shown, but it is understood that any number may be used. When the carrier screen is properly positioned as shown, each of the longitudinal slots 24 of the carrier screen is disposed immediately above one of the conveyor belts 10. Because none of the front-to-back wires 46 are disposed above any portion of the conveyor belts 10, the carrier screen is supported entirely by its leading and trailing edges. Thus, as shown in FIG. 3, each of the slots 24 of the carrier screen corresponds to one of the conveyor belts.

The product entrance conveyor belts 10 each wrap around an associated separate front pulley 22 which supports the belt and changes its direction. Each of the pulleys 23 is mounted to a relatively smaller common axle 18 to insure common axial alignment of the pulleys and to provide sufficient clearance for interdigitation around the pulleys. It is not necessary, however, that a common axle by used for all of the pulleys.

As also shown in FIG. 3, the slots 24 formed in the carrier screen are wider than the width of the conveyor belts 10 and their corresponding pulley 22 which is disposed immediately beneath it. This is essential to permit the longitudinal interdigitation of the carrier screen at the end of the entrance conveyor belts, where the belts change direction around the pulleys. It is preferable that the belts be spaced close enough together so that the particular bakery product being handled will not fall through the gap between the belts when supported by the belts alone. It is therefore preferred that the belts be as narrow as practicable and spaced as closely together as practicable.

It should be pointed out that although each of the conveyor belts 10 are shown as having the same size, it is not necessary that these belts be of the same width, or evenly spaced from one another. It is only necessary that the carrier screen be cooperatively designed so that each slot on the carrier screen is slightly wider and directly above the particular conveyor belt and corresponding front pulley which are disposed immediately beneath it.

Figure 1:
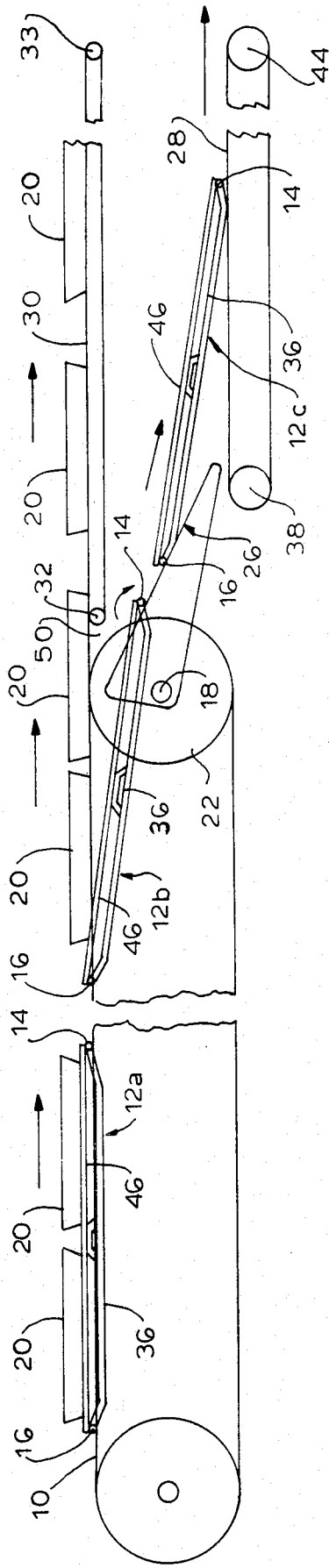
FIG. 1 is a somewhat schematic side view of the device of the present invention showing three carrier screens and several bakery products at various stages of the removal process.

Referring now to FIG. 1, the operation of one embodiment of the invention will be described in detail. In that figure, three carrier screens are shown, each of which is in a different stage of removal from the conveying means. In stage 1, the carrier screen 12a is entirely supported on the conveying means by its leading and trailing edges, with its reinforcing bars somewhat below the plane of the conveyor belts. Two trays of product 20 are on the carrier screen and are fully supported by the product support surface. Stage 2 of FIG. 1, depicts a carrier screen 12b as it begins to longitudinally interdigitate around the front pulleys at the end of the product entrance conveyor belts. As the screen approaches the right end of the conveyor, as a result of the movement of belts 10, the leading edge of the carrier screen follows the curvature of the pulleys 22 of the product entrance conveyor to about the two o'clock position as the carrier screen interdigitates around the pulley. The carrier screen thus tips down at an angle, lowering the product trays 20 which were supported on its product support surface down to the conveyor belts 10. As shown in Stage 2 of FIG. 1, the forwardmost product is supported entirely by the conveyor belts 10 and not by the carrier screen product support surface, while the rearward product is primarily supported by the belts, but still partially supported at its back edge by the carrier screen.

This lowering of the product trays on to the conveyor belt occurs smoothly and gradually as the leading edge of the screen descends around the front pulley. The leading edge of the carrier screen continues in its downward descent until it reaches the screen exit means, which is conveniently a slide formed by a plurality of rods 26 extending in between the pulleys of the product entrance conveyor belts downwardly at a slant away from the product entrance conveyor. As can be seen, during interdigitation of the carrier screen around the front pulleys of the product entrance conveyor belts, the carrier screen remains supported by its trailing edge during the downward motion of the front edge around the forwardmost pulley and on to the screen exit means. Thus belts 10 continue to drive the screen to the right in FIG. 1. The trailing edge continues to be supported by the product entrance conveyor belts until it, too, reaches the top of the forwardmost product entrance conveyor belt pulleys and begins its downward descent around the front top quarter of the pulleys.

Simultaneously with this downward and forward motion of the carrier screen, the products are continuing in a forward motion on the product entrance conveyor. When these products reach the pulleys 22, they continue on to the product exit conveyor 30, which may be of any convenient design, to continue their transportation to any location as desired. In the preferred embodiment of the invention shown in FIGS. 1,2 and 3, the product exit conveyor is a conventional full width conveyor belt 20 supported by pulleys or rollers 32, 33. As best seen in FIG. 2, the upper surface of the back end of exit conveyor 30 is aligned with the upper surface of the front end of the entrance conveyor 10 where it wraps around the front pulley 22. It is preferred that the product exit conveyor means back pulley 32 be of a considerably smaller diameter than the product entrance conveyor belt pulleys 22 in order to minimize the width of the space 50 between the entrance conveyor and the exit conveyor, although it is not essential to the invention that the exit conveyor have a relatively smaller rear pulley. It is also preferred that the upper surface of the exit conveyor be horizontal and in the same plane as the upper surface of the product entrance conveyor to minimize the possibility of the product sipping off, although this also is not essential to the invention.

Driving means are provided for the exit conveyor (not shown) which will maintain the substantially horizontal forward motion of the bakery products at the same speed as the entrance conveyor. It is preferable that the speed of the exit conveyor be the same or nearly the same as the entrance conveyor, although maintaining a somewhat faster speed in the exit conveyor will not adversely effect the operation of the device. As the products reach the end of the product entrance conveyor belts, they traverse the space 50 and are picked up by the exit conveyor to continue their forward motion in a substantially continuous manner.

It should be pointed out that the product exit means need not be a conveyor belt, however, and even a simple inclined plane for sliding the bakery products away from the end of the entrance conveyor may be utilized.

As the carrier screen continues its downward decent along the inclined screen exit slide, ultimately, the front end reaches the carrier screen exit conveyor 28, which can be of any convenient design, and in this embodiment is a conventional wide conveyor belt with rear pulley 38 and front pulley 44, where it continues transportation to any desired location. It should be pointed out that any convenient means for causing the screen to continue in a generally forward but downward path can be substituted for the slide and/or exit conveyor, such as a slanted conveyor belt.

As can be seen, the operation of the device is smooth, continuous, and simple, thereby insuring reliable and trouble free operation.

The terms and expression which have been employed herein are used as terms of description and not of limitation, and there is no intention in the use of such terms and expressions of excluding any equivalence of the features shown and described are portions thereof. Although illustrative embodiments of the invention have been described herein with reference with to the accompanying drawings, it is to be understood that various changes and modifications can be effective therein without departing from the scope or spirit of the invention.

What is claimed is:

1. A device for removing a longitudinally slotted carrier screen from a bakery product or the like carried thereon comprising, a moving product entrance conveyor means, a product exit conveying means for receiving products from the entrance conveyor means, said entrance conveyor means including means for interdigitating said carrier screen around the end of said entrance conveyor means adjacent said exit conveying means to cause aaid carrier screen to move downwardly away from products remaining on the entrance conveyor means and moving therewith; wherein said interdigitating means of the entrance conveyor means includes a plurality of substantially parallel and spaced apart product entrance conveying means, all of which are substantially in the same plane, said conveying means each having a width less than the longitudinal slot of a carrier screen disposed immediately above them the slotted carrier screen is correctly positioned upon said plurality of product entrance conveying means, with the slots of said screen parallel to and directly above the corresponding product entrance conveying means so that the carrier screen is supported only by its leading edge and its trailing edge, the forwardmost ends of said conveying means being adapted to permit interdigitation of a cooperatively designed longitudinally slotted carrier screen around them.

2. The device as defined in claim 1 wherein said product exit conveying means is disposed in front of and generally aligned with the forward end of said product entrance conveying means, said exit conveying means spaced a sufficient distance away from the forward end of said product entrance conveying means so that the leading and trailing edges of said carrier screen may be introduced downwardly between said product entrance conveying means and said exit conveying means without interference during interdigitaion of said carrier screen around said product entrance conveying means.

3. The device as defined in claim 1, wherein said entrance conveying means comprise a plurality of substantially parallel and spaced apart product entrance conveyor belts, all of which are substantially in the same plane, each of said belts having a width less than the slot of the carrier screen disposed immediately above it when the slotted carrer screen is correctly positioned upon said product entrance conveyor with its slots parallel to and directly above the corresponding belt of the product entrance conveyor so that the carrier screen is supported only by its leading edge and its trailing edge.

4. The device as defined in claim 3 including pulleys positioned at the forward ends of the product entrance conveyor belts for supporting and changing the direction of each of said product entrance conveyor belts at the end of said product entrance conveyor belts, all of said pulleys being substantially axially aligned and having a width less than the slot of the carrier screen disposed immediately above the belt supported by said front pulley to permit interdigitation of the carrier screen around said product entrance conveyor belts and their supporting front pulleys at the ends of said product entrance conveyor belts.

5. The device as defined in claim 4 wherein said product exit conveying means is disposed in front of and generally aligned with the forward ends of said product entrance conveying means, said exit conveying means spaced a sufficient distance away from the forward end of said product entrance conveying means so that the leading and trailing edges of said carrier screen may be introduced downwardly between said product entrance conveying means and said exit conveying means without interference during interdigitation of said carrier screen around said product entrance conveyor belts and their corresponding pulleys.

6. The device as defined in claim 5, wherein said product exit conveying means comprises:
 (a) a product exit conveyor belt;
 (b) a back pulley for supporting and changing the direction of said product exit conveyor belt, said back pulley having an axis substantially parallel to the axes of the product entrance conveyor belts' front pulleys and sufficiently spaced away from said front pulleys so that the leading and trailing edges of the carrier screen may be introduced downwardly between said front pulleys and said back pulleys without interference during interdigitation of said carrier screen aroung said product entrance conveyor belts and their corresponding pulleys; and
 (c) exit means for said carrier screen disposed generally beneath the plane said product exit conveyor belt.

7. A method for removing a carrier screen supported by a horizontally moving entrance conveying means from underneath a carrier bakery product and placing said bakery product on an exit conveying means, said carrier screen having a generally planar product support surface, a leading edge extending from side to side, a trailing edge substantially parallel to said leading edge and extending from side to side, and a plurality of generally parallel slots extending continuosly from the leading edge to the trailing edge; and said moving entrance conveying means comprising a plurality of substantially parallel and spaced apart product entrance conveyor belts so that the carrier screen is supported on the entrance conveyor belts by only the leading edge and the trailing edge of said carrier screen; said method comprising the steps of:
 (a) transporting said carrier screen along said product entrance conveying means to the end of the product entrance conveying means so that the leading edge of the carrier screen follows the direction of travel of the product entrance conveyor belts as said belts change direction around front pulleys disposed at the front end of said belts and the carrier screen begins to interdigitate over said front pulleys and said product entrance conveyor belts;
 (b) moving said leading edge of said carrier screen forwardly and away from the product entrance conveyor belts and pulleys in a downward and forward direction;
 (c) continuing interdigitation of said carrier screen while simultaneously transporting said carrier screen by its trailing edge forward on said entrance conveying means so that the carrier screen tends to move forwardly and at a slant;
 (d) simultaneously with said interdigitation of said carrier screen over said front pulleys, lowering said bakery product onto said entrance conveyor directly while keeping the horizontal speed of said bakery product substantially constant;
 (e) transferring said bakery product from said product entrance conveyor belts to a product exit conveying means;
 (f) continuing interdigitation of said carrier screen around said product entrance conveyor belts and their corresponding front pulleys while simultaneously transporting said carrier screen forward on said entrance conveyor by its trailing edge until said trailing edge reaches the end of said conveyor and begins to follow the direction of travel of the product entrance conveyor belts as said belts change direction around the front pulleys; and
 (g) moving said trailing edge of said carrier screen away from the product entrance conveyor belts and pulleys and continuing said movement until said carrier screen is completely free of said product entrance conveyor.

8. The method of claim 7, wherein the step of transferring said bakery product from said product entrance conveying means to a product exit conveying means is accomplished while moving said bakery product at substantially the same speed and direction as the product entrance conveyor and while keeping the horizontal speed of said bakery product substantially constant.

* * * * *